United States Patent
Watanabe

(10) Patent No.: US 10,005,186 B2
(45) Date of Patent: Jun. 26, 2018

(54) WORKPIECE CONVEYING DEVICE HAVING POSITIONING STRUCTURE

(71) Applicant: FANUC CORPORATION, Minamitsuru-gun, Yamanashi (JP)

(72) Inventor: Hideyuki Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days. days.

(21) Appl. No.: 14/686,931

(22) Filed: Apr. 15, 2015

(65) Prior Publication Data
US 2015/0306773 A1    Oct. 29, 2015

(30) Foreign Application Priority Data

Apr. 23, 2014    (JP) .................................. 2014-089077

(51) Int. Cl.
| | | |
|---|---|---|
| B25J 15/08 | (2006.01) | |
| B25J 15/00 | (2006.01) | |
| B21J 13/10 | (2006.01) | |
| B25J 9/16 | (2006.01) | |

(Continued)

(52) U.S. Cl.
CPC .......... *B25J 15/0028* (2013.01); *B21J 13/10* (2013.01); *B25J 9/1679* (2013.01); *B25J 15/0061* (2013.01); *B25J 15/0253* (2013.01); *B25J 15/086* (2013.01); *B25J 19/023* (2013.01)

(58) Field of Classification Search
CPC .... B25J 19/023; B25J 15/086; B25J 15/0014; B25J 15/0028
See application file for complete search history.

(56) References Cited

U.S. PATENT DOCUMENTS

| | | | | |
|---|---|---|---|---|
| 4,699,414 A | * | 10/1987 | Jones | ..................... B25J 15/026 901/38 |
| 5,446,835 A | * | 8/1995 | Iida | ........................ B25J 9/1687 700/259 |
| 9,393,700 B2 | * | 7/2016 | Sun | ...................... B25J 15/0014 |

(Continued)

FOREIGN PATENT DOCUMENTS

| | | |
|---|---|---|
| JP | 03228589 A | 10/1991 |
| JP | 04183590 A | 6/1992 |

(Continued)

OTHER PUBLICATIONS

Japanese Notification of Reasons for Refusal of JP app. 2014-089077, dated Jan. 23, 2017 (machine translation).*

*Primary Examiner* — Gerald McClain
(74) *Attorney, Agent, or Firm* — RatnerPrestia

(57) ABSTRACT

A workpiece conveying device capable of correctly positioning and conveying a workpiece that has a burr having an indefinite shape by means of a robot. A robot hand has first and second claws configured to move toward and away from each other. The first claw has a first contacting portion configured to come into contact with a lower surface of the burr, and a first clamping portion arranged at a front end of the first contacting portion and configured to come into contact with a main body of the workpiece. The second claw has a second contacting portion configured to come into contact with the lower surface of the burr, and a second clamping portion arranged at a front end of the second contacting portion and configured to come into contact with the main body. The first and second clamping portions cooperatively position and clamp the main body.

5 Claims, 5 Drawing Sheets

(51) Int. Cl.
*B25J 15/02* (2006.01)
*B25J 19/02* (2006.01)

(56) References Cited

U.S. PATENT DOCUMENTS

| | | | |
|---|---|---|---|
| 2005/0229725 A1* | 10/2005 | Dvir | H01L 21/681 73/865.8 |
| 2010/0123325 A1 | 5/2010 | Maffeis | |
| 2010/0156127 A1* | 6/2010 | De Kervanoael | B25J 15/0253 901/39 |
| 2011/0048650 A1* | 3/2011 | Lawson | B25J 15/0028 157/16 |
| 2015/0123416 A1* | 5/2015 | Kitamura | B25J 15/0038 901/32 |
| 2015/0251321 A1* | 9/2015 | Ishikawa | B25J 15/0047 294/183 |

FOREIGN PATENT DOCUMENTS

| | | | |
|---|---|---|---|
| JP | 05-131240 A | | 5/1993 |
| JP | 05131240 a | * | 5/1993 |
| JP | 2003-276838 A | * | 10/2003 |
| JP | 2003276838 A | | 10/2003 |

* cited by examiner

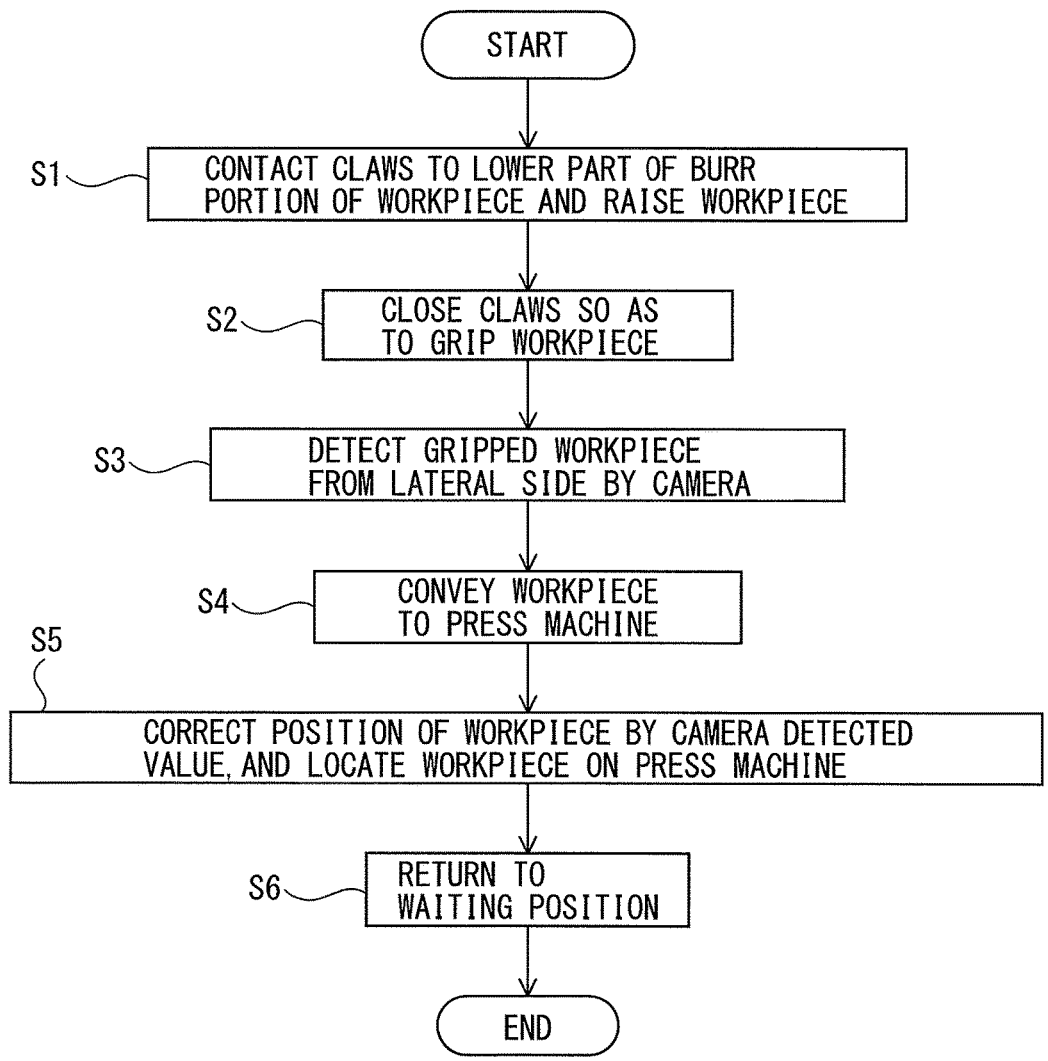

WORKPIECE CONVEYING DEVICE HAVING POSITIONING STRUCTURE

BACKGROUND OF THE INVENTION

1. Field of the Invention

The preset invention relates to a workpiece conveying device having a robot for conveying a workpiece that has a burr, such as a hot forged part.

2. Description of the Related Art

When a material such as a metal that has a forged part is manufactured by hot-forging or cold-forging, a plate-like burr or excess thickness portion may be formed on the forged part. When the product that has a burr (or a workpiece) is conveyed to a next process stage, it is necessary to consider the existence of the burr.

As relevant prior art documents, JP H05-131240 A discloses a robot 1 configured to grip an outer edge of a burr 22 by moving grip claws 8 at a frond end of a robot arm 4, based on data obtained by image-processing an image which is obtained by capturing a formed article 20 on a relay table 11 by means of a camera 5.

In JP H05-131240 A, the forged article with the burr is detected by means of the camera from above, and the burr is gripped so as to convey the forged article. Concretely, a boundary between the burr and a main body of the forged article is detected by the camera so as to correct the position of the grip claws. However, it is actually difficult to correctly detect the boundary between the burr and the main body based on an image obtained by the camera, and the grip claws may fail to grip the article or may damage the main body.

SUMMARY OF THE INVENTION

Therefore, an object of the present invention is to provide a workpiece conveying device capable of correctly positioning and conveying a workpiece with a burr having an indefinite shape, such as a hot-forged article, by means of a robot.

According to the present invention, a workpiece conveying device for gripping and conveying a workpiece having a main body and a burr portion projecting from the main body, by means of a robot having a hand with at least two claws configured to move toward and away from each other, wherein each of the at least two claws has a contacting portion which comes into contact with a lower surface of the burr portion so as to position the workpiece in a vertical direction, and a clamping portion arranged at a front end of the contacting portion, the clamping portion being configured to clamp the main body of the workpiece so as to position the workpiece in a gripping direction of the workpiece, and wherein the hand positions the workpiece in the gripping direction while maintaining a state in which the workpiece is positioned in the vertical direction is provided.

In a preferred embodiment, the workpiece conveying device comprises: a camera which captures the workpiece gripped by the hand; and a correcting part which corrects a location of the workpiece where the workpiece is to be conveyed, based on a position of the main body detected by the camera.

The workpiece conveying device may comprise a servomotor configured to change a distance between the at least two claws. In this case, it is preferable that the servomotor be controlled so that the at least two claws grip the main body of the workpiece with a determined force.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 2b is a side view of the workpiece of FIG. 2a;

FIG. 5 is a flowchart showing an example of a procedure using the workpiece conveying device of the present invention;

DETAILED DESCRIPTION

Figure 1:
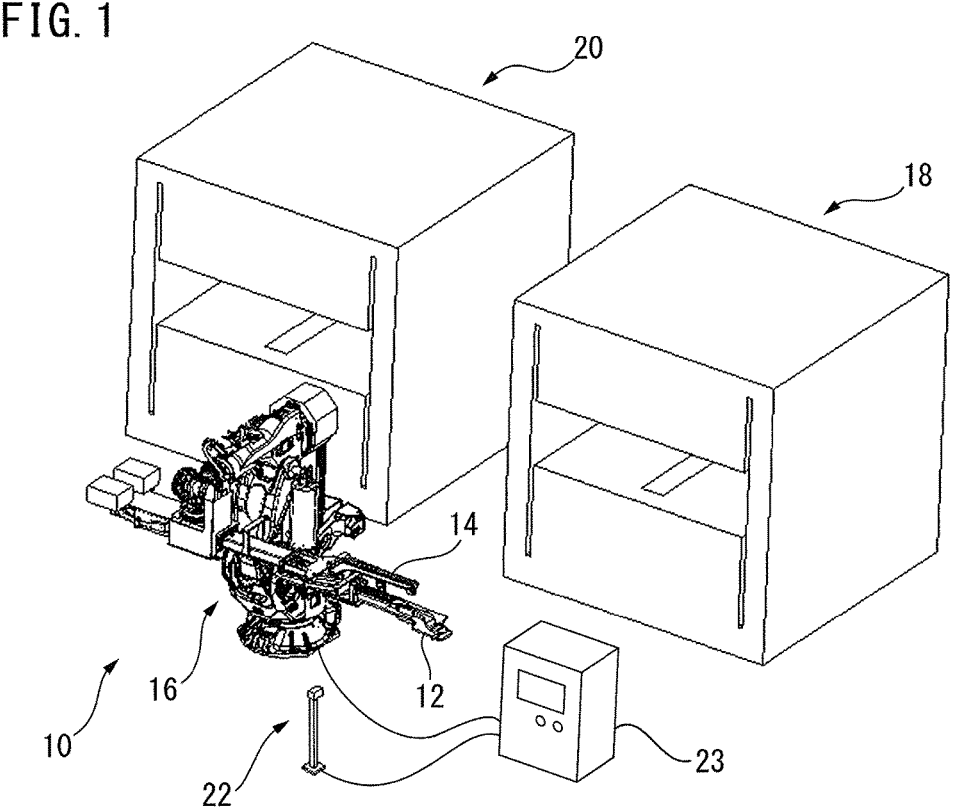
FIG. 1 is a view showing a workpiece conveying device according to one embodiment of the present invention, with a press machine.

FIG. 1 is a schematic view of a workpiece conveying device 10 according to a preferred embodiment of the present invention, along with a workpiece 12 having a burr to be conveyed and places where workpiece 12 is conveyed from and to. Workpiece conveying device 10 has a robot 16 having a hand 14 configured to grip workpiece 12, and it is preferable that robot 16 be a multi-joint robot having six axis, etc. In this embodiment, a hot-forged article 12 having a burr with an indefinite shape (the workpiece with the burr), which is hot-forged in a first press machine 18, is held by robot 16, and then is conveyed to a second press machine 20. Workpiece conveying device 10 may have a camera 22 configured to capture workpiece 12 gripped by robot 16, and the motions of camera 22 and robot 16 can be controlled by a schematically shown controller 23.

Figure 2A:
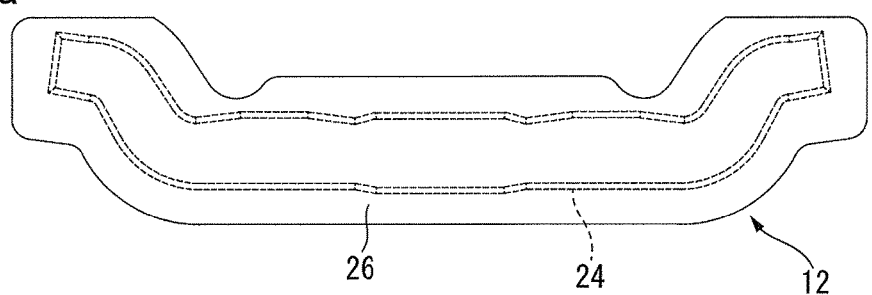
FIG. 2a is a top view of a workpiece having a burr.
Figure 2B:
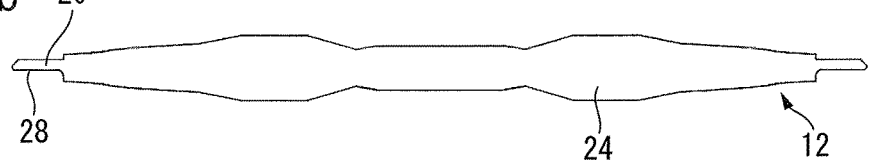

FIGS. 2a and 2b are views of an example of the shape of workpiece 12 to be conveyed by robot 16, and show top and side views of workpiece 12, respectively. Workpiece 12 has a main body 24 and a burr portion (hereinafter, merely referred to as the "burr") 26 having an indefinite shape protruding from main body. Normally, burr 26 is formed as a plate portion having a thickness (or a dimension in the vertical direction) smaller than main body 24. Further, a lower surface 28 of burr 26 is a generally flat surface.

Figure 3:
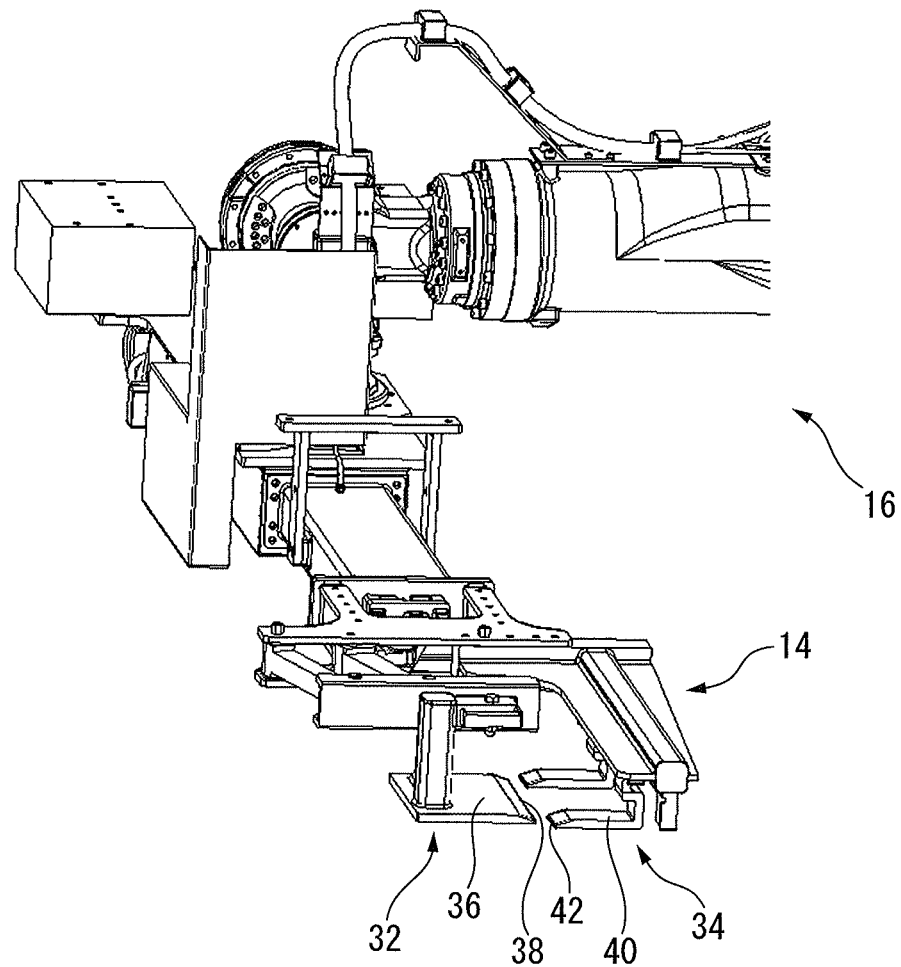
FIG. 3 shows an example of a structure of a robot hand having gripping claws.

FIG. 3 shows the structure of hand 14 of robot 16 for holding workpiece 12. Hand 14 has at least two claws configured to move toward and away from each other. In the illustrated embodiment, hand 14 has a first claw 32 and a second claw 34. First claw 32 has a first contacting portion 36 configured to come into contact with lower surface 28 of burr 26, and a first clamping portion 38 arranged at a front end of first contacting portion 36 and configured to come into contact with (a lateral side of) main body 24 of workpiece 12. Further, second claw 34 has a second contacting portion 40 configured to come into contact with lower surface 28 of burr 26, and a second clamping portion 42 arranged at a front end of second contacting portion 40 and configured to come into contact with (a lateral side of) main body 24 of workpiece 12. First clamping portion 38 and second clamping portion 42 are configured to cooperatively position and clamp main body 24 of workpiece 12.

Figure 4A:
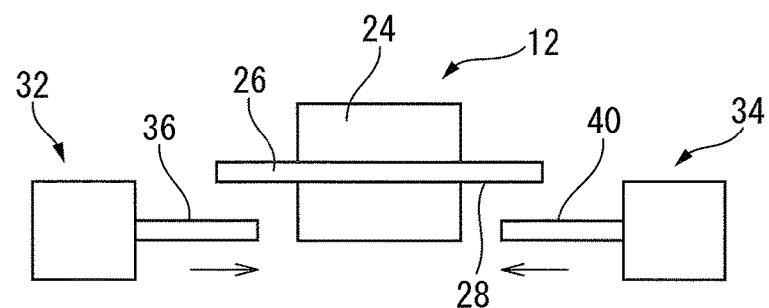
FIG. 4a schematically shows the robot hand and the workpiece having the burr, and shows a state in which the claws of the hand are positioned below the burr of the workpiece.
Figure 4B:
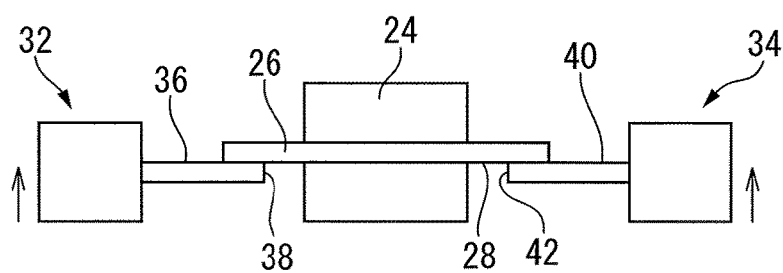
FIG. 4b shows a state in which the claws of the hand come into contact with a lower surface of the burr of the workpiece.
Figure 4C:
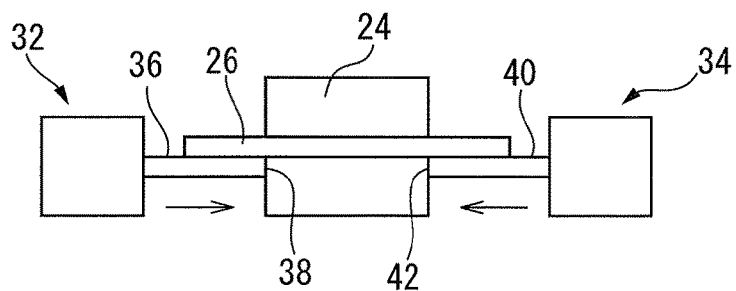
FIG. 4c shows a state in which the claws of the hand clamp the main body of the workpiece.

FIGS. 4a to 4c schematically show the motion of hand 14. First, as shown in FIG. 4a, first claw 32 and second claw 34 are moved below burr 26 of workpiece 12. Then, as shown in FIG. 4b, by raising (or upwardly moving) first claw 32 and second claw 34, first contacting portion 36 of first claw 32 and second contacting portion 40 of second claw 34 come into contact with lower surface 28 of burr 26, whereby workpiece 12 is raised.

Next, as shown in FIG. 4c, at least one of first claw 32 and second claw 34 is moved so that first claw 32 and second claw 34 approach each other, so that first clamping portion 38 of first claw 32 and second clamping portion 42 of second claw 34 dome into contact with main body 24 of workpiece 12. By virtue of this, main body 24 is positioned (the position of main body 24 is determined) and clamped or sandwiched. In this regard, if desired, first contacting portion 36 of first claw 32 and second contacting portion 40 of second claw 34 may slide on lower surface 28 of burr 26. Therefore, hand 14 may position (or determine the position of) workpiece 12 in the gripping direction (or the generally horizontal direction), while maintaining a state in which workpiece 12 is positioned (or retained) in the vertical direction (or the gravitational direction). As described above, since hand 14 is configured to clamp main body 24 having a precise dimension, workpiece 12 can be accurately positioned and gripped even when workpiece 12 has burr 26 that has the indefinite shape.

Next, with reference to a flowchart of FIG. 5, an example of a series of procedure using workpiece conveying device 10 will be explained. First, as explained with reference to FIGS. 4a and 4b, first claw 32 and second claw 34 of hand 14 of robot 16 contact lower surface 28 of burr 26 of workpiece 12 and raise workpiece 12, after workpiece 12 is forged by first press machine 18 and located in first press machine 18 (step S1). Then, as explained with reference to FIG. 4c, first claw 32 and second claw 34 are moved toward each other so as to clamp main body 24 of workpiece 12 (step S2).

Figure 6:
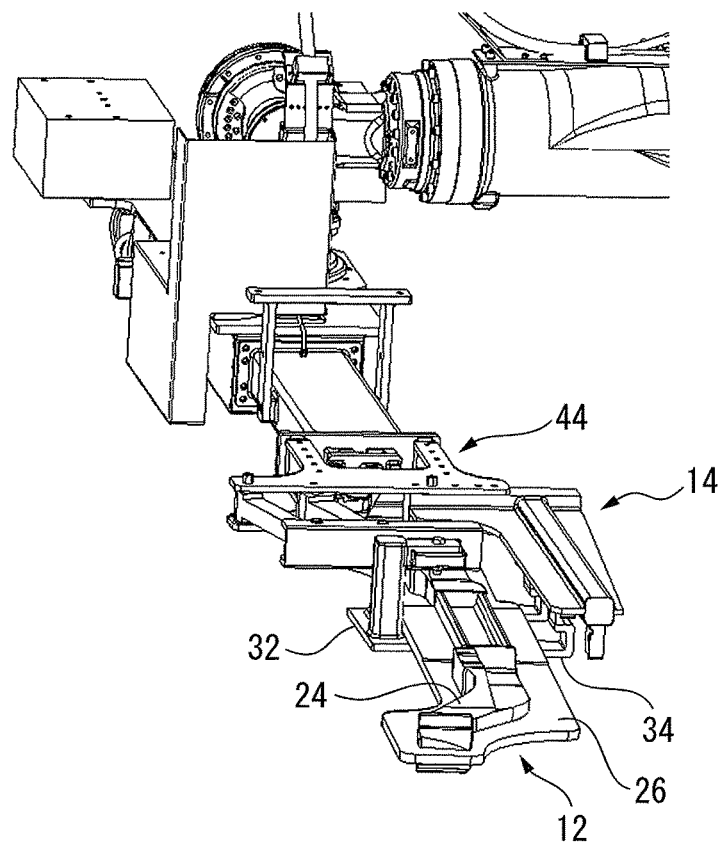
FIG. 6 shows a state in which the robot hand of FIG. 3 grips the workpiece having the burr.

FIG. 6 shows workpiece 12 positioned and gripped by hand 14 as described above. In this regard, although various types of driving parts may be used to drive at least one of first claw 32 and second claw 34 in order to change the distance between the claws, a servomotor 44 is preferable as the driving part. By using servomotor 44, the difference between the claws can be arbitrarily and precisely changed. Further, by controlling servomotor 44 so that first claw 32 and second claw 34 grip main body 24 of workpiece 12 with a preset force, workpiece 12 can be conveyed without damaging main body 24.

Figure 7:
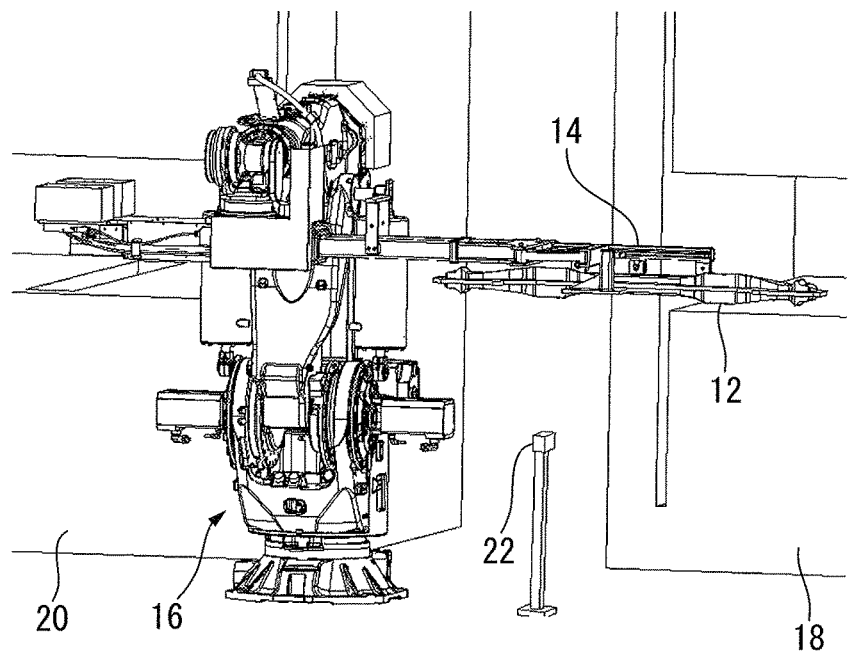
FIG. 7 shows a state in which the workpiece having the burr gripped by the robot hand is captured by a camera.

In the next step S3, as shown in FIG. 7, workpiece 12 gripped by hand 14 is captured so as to detect the position of workpiece 12, by using camera 22 as described above. Concretely, camera 22 is configured and positioned so that camera 22 captures workpiece 12 in a direction (in the illustrated embodiment, a lateral direction) as to obtain an image of an outer shape (or a profile) of main body 24.

For example, in case that workpiece 12 has an elongated shape as shown in FIG. 2, the position of workpiece 12 relative to hand 14 in the longitudinal direction of workpiece 12 (in FIG. 7, in the horizontal direction) may not be uniquely determined, when hand 14 grips workpiece 12. In such a case, by using camera 22 so as to detect the position (in particular, in the longitudinal direction), the position and orientation of workpiece 12 can be accurately determined.

Next, in step S4, robot 16 is operated so that workpiece 12 gripped by hand 14 is conveyed to a predetermined place (in the embodiment, second press machine 20). Then, in step S5, the image obtained by camera 22 is processed so as to detect the position of main body 24 of workpiece 12, and workpiece 12 is placed at a predetermined position in second press machine 20 while appropriately correcting the placement position of workpiece 12 in second press machine 20, based on the detected position of main body 24. In this regard, an image-processing part (or an image-processing function) for carrying out the above image-processing and a correcting part (or a correcting function) for correcting the placement position of the workpiece may be included in controller 23 as described above. However, another device may be used as the image-processing part and/or the correcting part. Finally, robot 16 is returned to a predetermined waiting position (step S6), and the series of procedure is terminated.

As explained above, in the present invention, the contacting portion arranged on the upper surface of each claw of the robot hand is configured to come into contact with the lower surface of the burr so as to position the workpiece in the vertical direction (or the gravity direction), and the clamping part formed at the front end of each claw is configured to clamp the main body of the workpiece so as to position the workpiece in the gripping direction (or the generally horizontal direction). Therefore, even when the workpiece has an indefinite shape such as a burr, the workpiece can be conveyed while the position and orientation of the workpiece are precisely determined.

In the above embodiment, the workpiece to be conveyed is explained as a hot-forged article having a burr, whereas the present invention is not limited as such. In other words, the present invention can be applied to any workpiece as long as the workpiece has a burr that has an indefinite shape and the workpiece can be raised or lifted by supporting the burr by means of gripping claws of a robot hand.

According to the present invention, a workpiece having a burr with an indefinite shape can be precisely positioned in both the vertical direction and the griping direction by means of one hand.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A method for gripping and conveying a workpiece having a main body and a burr portion projecting from the main body, by means of a robot having a hand with at least two claws configured to move toward and away from each other, wherein each of the at least two claws has a contacting portion which comes into contact with a lower surface of the burr portion so as to position the workpiece in a vertical direction, and a clamping portion arranged at a front end of the contacting portion, the clamping portion being configured to clamp the main body of the workpiece so as to position the workpiece in a gripping direction of the workpiece, and wherein the method comprises:

positioning the workpiece in the vertical direction by contacting the contacting portions with the lower surface of the burr portion;

maintaining a vertical position of the workpiece by contacting the contacting portions with the lower surface of the burr portion;

gripping the main body of the workpiece at a position below the burr portion of the workpiece with the clamping portions at the same time as maintaining the vertical position of the workpiece with the contacting portions; and positioning the workpiece in the gripping direction of the workpiece.

2. The method as set forth in claim 1, further comprising: capturing the workpiece gripped by the hand with a camera; and correcting a location of the workpiece where the workpiece is to be conveyed with a correcting part, based on a position of the main body detected by the camera.

3. The method as set forth in claim 1, further comprising changing a distance between the at least two claws, with a servomotor.

4. The method as set forth in claim 3, further comprising controlling the servomotor so that the at least two claws grip the main body of the workpiece with a predetermined force.

5. The method as set forth in claim 1, wherein the workpiece is a hot-forged article.

\* \* \* \* \*